(12) United States Patent
Li et al.

(10) Patent No.: US 11,468,446 B2
(45) Date of Patent: Oct. 11, 2022

(54) METHOD FOR ADJUSTING RISK PARAMETER, AND METHOD AND DEVICE FOR RISK IDENTIFICATION

(71) Applicant: ADVANCED NEW TECHNOLOGIES CO., LTD., Grand Cayman (KY)

(72) Inventors: Chao Li, Hangzhou (CN); Hua Zhao, Hangzhou (CN); Chunjie Dong, Hangzhou (CN); Hong Jin, Hangzhou (CN); Lijie Zhang, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 69 days.

(21) Appl. No.: 16/424,038

(22) Filed: May 28, 2019

(65) Prior Publication Data

US 2019/0279217 A1    Sep. 12, 2019

Related U.S. Application Data

(63) Continuation of application No. PCT/CN2018/073374, filed on Jan. 19, 2018.

(30) Foreign Application Priority Data

Jan. 23, 2017  (CN) .......................... 201710050504.8

(51) Int. Cl.
*G06Q 20/40* (2012.01)
*G06F 17/16* (2006.01)

(52) U.S. Cl.
CPC ......... *G06Q 20/4016* (2013.01); *G06F 17/16* (2013.01); *G06Q 20/4014* (2013.01)

(58) Field of Classification Search
CPC .................................................. G06Q 20/4016
See application file for complete search history.

(56) References Cited

U.S. PATENT DOCUMENTS

| 6,019,678 A | 2/2000 | Takahashi et al. |
| 6,330,546 B1 | 12/2001 | Gopinathan et al. |
| (Continued) | | |

FOREIGN PATENT DOCUMENTS

| AU | 2006235024 A1 | 10/2006 |
| CN | 102203724 A | 9/2011 |
| (Continued) | | |

OTHER PUBLICATIONS

Written Opinion of the International Searching Authority and International Search Report for PCT Application No. PCT/CN2018/073374 dated Apr. 19, 2018 (10 pages).

(Continued)

*Primary Examiner* — Bennett M Sigmond
*Assistant Examiner* — Xavier M. Bennett

(57) ABSTRACT

Methods, systems, and apparatus, including computer programs encoded on computer storage media, for payment services are provided. One of the methods includes: receiving a payment request, the payment request containing a user identifier and operation data generated in a current transaction corresponding to the user identifier; determining, according to the operation data, at least one operation hopping sequence in the current transaction, the operation hopping sequence containing at least one operation hopping event; obtaining, from a set of risk parameters corresponding to the user identifier, a risk parameter corresponding to the operation hopping event in the operation hopping sequence, risk parameters in the set of risk parameters being obtained by adjusting risk parameters used for risk identification in a previous transaction according to operation data generated in the previous transaction corresponding to the (Continued)

user identifier; and adjusting the obtained risk parameter according to the at least one operation hopping sequence.

20 Claims, 6 Drawing Sheets

(56) References Cited

U.S. PATENT DOCUMENTS

| | | | |
|---|---|---|---|
| 6,829,590 B1 | 12/2004 | Greener et al. | |
| 6,985,878 B1 | 1/2006 | Yamazaki et al. | |
| 6,999,943 B1 | 2/2006 | Johnson et al. | |
| 7,024,383 B1 | 4/2006 | Mancini et al. | |
| 7,752,126 B2 | 7/2010 | Wang | |
| 7,865,427 B2 | 1/2011 | Wright et al. | |
| 8,401,954 B2 | 3/2013 | Shepherd | |
| 8,412,155 B2 | 4/2013 | Mccanna et al. | |
| 8,856,923 B1 | 10/2014 | Kolman et al. | |
| 9,947,006 B2 | 4/2018 | Mestré et al. | |
| 2002/0138371 A1 | 9/2002 | Lawrence et al. | |
| 2002/0138407 A1* | 9/2002 | Lawrence | G06Q 40/08 705/38 |
| 2005/0097320 A1* | 5/2005 | Golan | G06F 21/40 713/166 |
| 2006/0226216 A1* | 10/2006 | Keithley | G06Q 20/4016 235/379 |
| 2007/0239604 A1 | 10/2007 | O'connell et al. | |
| 2010/0094767 A1 | 4/2010 | Miltonberger | |
| 2010/0094768 A1 | 4/2010 | Miltonberger | |
| 2010/0094791 A1* | 4/2010 | Miltonberger | G06Q 10/10 706/46 |
| 2011/0185405 A1 | 7/2011 | Ganesan | |
| 2012/0039469 A1* | 2/2012 | Mueller | H04L 63/0428 380/252 |
| 2012/0204257 A1 | 8/2012 | O'connell et al. | |
| 2012/0226613 A1* | 9/2012 | Adjaoute | G06Q 40/02 705/44 |
| 2016/0005044 A1* | 1/2016 | Moss | G06Q 20/4016 705/44 |
| 2016/0104163 A1 | 4/2016 | Aquino et al. | |
| 2016/0307199 A1 | 10/2016 | Patel et al. | |
| 2017/0083985 A1* | 3/2017 | Lacoss-Arnold | G06Q 20/3224 |
| 2018/0322597 A1* | 11/2018 | Sher | G06Q 50/163 |

FOREIGN PATENT DOCUMENTS

| | | | |
|---|---|---|---|
| CN | 102722814 B | 8/2015 | |
| CN | 105550876 A | 5/2016 | |
| CN | 105631668 A | 6/2016 | |
| CN | 106296193 A | 1/2017 | |
| EP | 1017004 A1 | 7/2000 | |
| EP | 3059694 A1 | 8/2016 | |
| JP | 2005509196 A | 4/2005 | |
| JP | 2007-514333 A | 5/2007 | |
| JP | 5632489 B2 | 11/2014 | |
| JP | 2015-176233 A | 10/2015 | |
| KR | 1020160122653 | 10/2016 | |
| WO | WO-2013082190 A1 * | 6/2013 | G06F 21/577 |
| WO | 2014/160296 A1 | 10/2014 | |
| WO | 2016/019093 A1 | 2/2016 | |

OTHER PUBLICATIONS

International Preliminary Report on Patentability Chapter I for PCT Application No. PCT/CN2018/073374 datedn Aug. 1, 2019 (10 pages).
Office Action and First Search for Chinese Application No. 201710050504.8 dated May 8, 2019 with English machine translation (12 pages).
Non-Final Office Action for Taiwanese Application No. 106139464 dated Jul. 5, 2019 (3 pages).
Second Office Action of Chinese Application No. 201710050504.8 dated Jan. 13, 2020, (13 Pages).
Office Action for Japanese Application No. 2019-540002 dated Sep. 29, 2020.
Search Report for European Application No. 18741403.2 dated May 29, 2020.
Written Opinion for Singaporean Application No. 11201905094T dated Aug. 13, 2020.
Notice of Allowance for Korean Application No. 10-2019-7017252 dated Dec. 28, 2021.

* cited by examiner

METHOD FOR ADJUSTING RISK PARAMETER, AND METHOD AND DEVICE FOR RISK IDENTIFICATION

CROSS REFERENCE TO RELATED APPLICATIONS

This application is a continuation application of International Application No. PCT/CN2018/073374, filed on Jan. 19, 2018, which claims priority to and benefits of Chinese Patent Application No. 201710050504.8 filed on Jan. 23, 2017. The contents of the above-referenced applications are incorporated herein by reference in their entirety.

TECHNICAL FIELD

This application relates to the field of information technology, and in particular to a method for adjusting a risk parameter, and a method and device for risk identification.

BACKGROUND

As on-line payment, on-line transfer and other electronic transaction methods become popular, it is of vital importance to ensure transaction security, and timely and accurate identify transaction risks.

Generally speaking, a user can register an account and set a transaction password on a client providing electronic transaction services (e.g., an electronic transaction application installed on a mobile phone and a browser page corresponding to an electronic transaction website), and link the account to a bank card of the user. When the user logs onto the client and inputs the transaction password in the client to request a payment, the client sends a payment request to a control server. The control server performs risk identification on the received payment request. If the result of risk control identification is safe (that is, the current transaction is performed by the user or by others authorized by the user), the control server performs a corresponding debit operation on the user's bank card according to the payment request. If the result of risk control identification is unsafe (that is, there is a high probability that the current transaction is performed by someone who obtains, without authorization, the account and password of the user), the control server can take measures such as instructing the client to freeze the current transaction, and send risk warning messages to a mobile phone number and email address linked to the account.

Currently, there are two risk identification methods. First, various risk identification rules are artificially defined according to known risks, and the control server performs risk identification on transactions according to the risk identification rules. Second, a risk identification system is provided with artificial intelligence on the control server. Massive historical operation data (including safe operation data and unsafe operation data) are provided to the risk identification system in advance using machine learning algorithms, such as random forest, logical regression and neural network. The risk identification system is trained so as to be able to obtain the risk identification rules according to the known risks and identify the risk of a new transaction to a certain extent.

In fact, the risk identification rules defined artificially or obtained through machine learning are too much dependent on the known risks. Unauthorized users always manage to crack the risk identification rules and constantly develop new means of on-line property theft, such that the risk identification system faces uncontrollable unknown risks. In the existing methods for risk identification, in order to deal with the constantly emerging means of property theft, the risk identification rules need to be updated frequently.

In the existing methods for risk identification, both artificial maintenance of the risk identification rules and updating of the risk identification rules through machine learning are only remedial measures after the risk identification rules are cracked. That is, the risk identification rules can only be updated through manual inputs or retraining of the risk identification system after unauthorized users have bypassed the risk identification rules using new means of property theft and caused incalculable losses to users.

In particular, on the one hand, the cost of manual inputs is too high, and negligence and omissions in the manual inputs are inevitable. On the other hand, retraining of the risk identification system often needs to be performed offline and takes months to complete. The existing methods for adjusting the risk identification rules result in high cost and serious delay.

SUMMARY

Embodiments of this application provide a method for adjusting a risk parameter, and a method and device for risk identification, so as to solve the problems of high cost and serious delay of existing methods for risk identification.

In order to solve the above technical problems, the embodiments of this application are implemented as described herein:

In one aspect, a method for adjusting a risk parameter is provided. The method includes: receiving a payment request, the payment request containing a user identifier and operation data generated in a current transaction correspond to the user identifier; determining, according to the operation data, at least one operation hopping sequence produced in the current transaction, the operation hopping sequence containing at least one operation hopping event; obtaining, from a set of risk parameters corresponding to the user identifier, a risk parameter corresponding to the operation hopping event, risk parameters contained in the set of risk parameters being obtained by adjusting risk parameters used for risk identification in a previous transaction, the risk parameters for the previous transaction being generated according to operation data generated in the previous transaction corresponding to the user identifier; and adjusting the obtained risk parameter according to the at least one operation hopping sequence.

In another aspect, a method for risk identification is provided. The method includes receiving a payment request, the payment request containing operation data of at least one dimension generated in a current transaction. With respect to a respective dimension, the method further includes: determining a risk degree of the current transaction according to the operation data of the respective dimension; and when different risk degrees of the current transaction corresponding to dimensions are obtained, performing risk identification on the current transaction according to the obtained different risk degrees.

In yet another aspect, a device for adjusting a risk parameter is provided. The device includes: a receiving module which receives a payment request, the payment request containing a user identifier and operation data generated in a current transaction through the user identifier; a determining module which determines, according to the operation data, at least one operation hopping sequence produced in the current transaction, the operation hopping sequence containing at least one operation hopping event; an obtaining module which obtains, from a set of risk parameters corresponding to the user identifier, a risk parameter corresponding to the operation hopping event contained in the operation hopping sequence, risk parameters contained in the set of risk parameters being obtained by adjusting risk parameters used for risk identification in a previous transaction according to operation data generated in the previous transaction corresponding to the user identifier; and an adjusting module which adjusts the obtained risk parameter according to the at least one operation hopping sequence.

In yet another aspect, a device for risk identification is provided. The device includes: a receiving module which receives a payment request, the payment request containing operation data of at least one dimension generated in a current transaction; a determining module which determines, with respect to each dimension, a risk degree of the current transaction according to the operation data of the dimension; and an identifying module which performs, when the risk degrees of the current transaction corresponding to each dimension are obtained, risk identification on the current transaction according to the obtained different risk degrees.

In yet another aspect, a risk identification system is provided. The system includes: a smart module which receives a transaction request, obtains operation data generated in a current transaction using a user identifier, performs risk analysis according to the operation data, and sends a risk analysis result to a risk identification module, the risk analysis result being obtained by one of the above methods for risk identification; and the risk identification module which performs risk analysis according to the received risk analysis result.

In yet another aspect, an apparatus is provided. The apparatus includes a processor and a memory coupled to the processor and configured to store instructions executable by the processor. The processor is configured to execute the instructions to perform operations including: receiving a payment request, the payment request containing a user identifier and operation data generated in a current transaction corresponding to the user identifier; determining, according to the operation data, at least one operation hopping sequence produced in the current transaction, the operation hopping sequence containing at least one operation hopping event; obtaining, from a set of risk parameters corresponding to the user identifier, a risk parameter corresponding to the operation hopping event contained in the operation hopping sequence, risk parameters contained in the set of risk parameters being obtained by adjusting risk parameters used for risk identification in a previous transaction according to operation data generated in the previous transaction corresponding to the user identifier; and adjusting the obtained risk parameter according to the at least one operation hopping sequence.

According to the embodiments of this application, operation data related to one transaction is converted into at least one operation hopping sequence. Each operation hopping sequence further includes at least one operation hopping event, and each operation hopping event corresponds to a risk parameter. The operation data related to one transaction is discretized into a plurality of independent operation hopping events. With respect to various user identifiers registered on a client providing electronic transaction services, a set of various risk parameters in a one-to-one correspondence to the various user identifiers is set, and real-time, on-line updating of the various risk parameters is supported. In one embodiment, once unauthorized users obtain the user identifier of a user and initiates a payment request to the control server on the client through the user identifier. Although the unauthorized users temporarily deceive the risk identification system and cause property losses to the user, the control server consistent with embodiments of the present specification can dynamically update the risk parameters timely corresponding to each operation hopping event involved in the transaction initiated through the user identifier on line according to the operation data contained in the payment request, without waiting for manual intervention/updates or offline retraining of the risk identification system. According to the methods as claimed in this application, the high-cost manual intervention/updates is avoided, and risk parameters can be dynamically updated on line without having to wait for several months for a risk identification system to be retrained, such that the risk identification system can be timely updated.

BRIEF DESCRIPTION OF THE DRAWINGS

To describe the technical solutions in the embodiments of this application or in the prior art more clearly, the following briefly introduces the accompanying drawings required for describing the embodiments or the prior art. Apparently, the accompanying drawings in the following description show merely some embodiments of this application, and a person of ordinary skill in the art may still derive other drawings from these accompanying drawings without creative efforts.

DETAILED DESCRIPTION OF THE EMBODIMENTS

Figure 1:
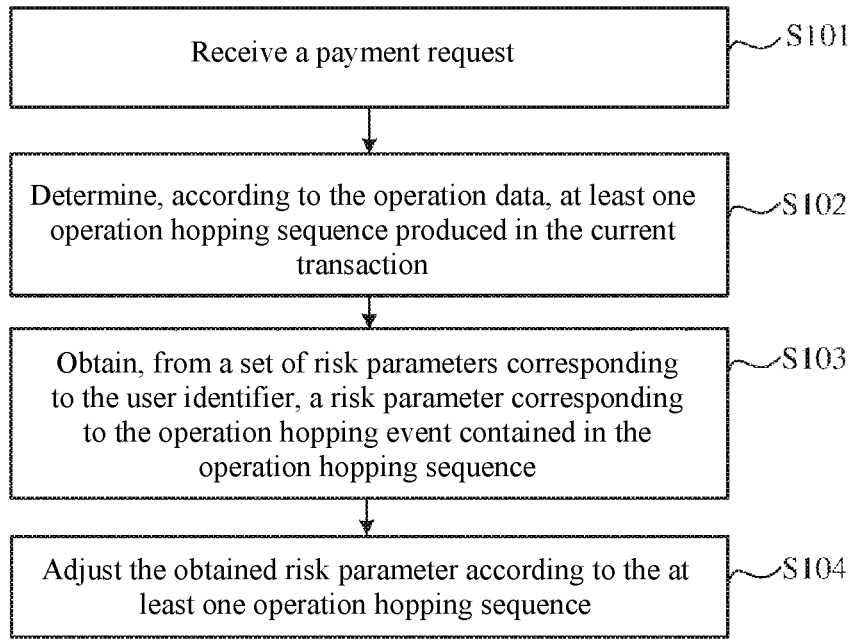
FIG. 1 is a flowchart of a method for adjusting a risk parameter according to one embodiment of this application.

To enable a person skilled in the art to better understand the technical solutions of this application, the technical solutions of the embodiments of this application will be described clearly and thoroughly below with reference to the accompanying drawings of the embodiments of this application. It is apparent that the described embodiments are merely some rather than all of the embodiments of this application. All other embodiments obtained by a person of ordinary skill in the art based on the embodiments of this application without creative efforts shall fall within the protection scope of this application.

In the technical field of on-line risk identification, the existing technologies described in the background section are usually used for on-line risk identification. That is, a risk identification system is trained by massive historical operation data using machine learning, so that the risk identification system can obtain risk identification rules. Further, the professional experience of experts is manually added to the risk identification rules. However, the method for risk identification based on the existing technologies is still deficient in terms of high cost and serious update delay.

For example, on-line risks are like playing games between hackers and risk identification systems. The risk identification rules on which the risk identification system maintained by a risk control administrator rely are determined based on known risks. After obtaining a user identifier of a user, unauthorized users always manage to crack the risk identification rules and develop new means of property theft. If the unauthorized users succeed, the risk control administrator can timely update the risk identification system to curb the increased harm caused by the new means of property theft, such that occasional success of the unauthorized users will not cause great on-line risks.

However, in the existing methods for risk identification, updates to a risk identification system are realized manually or through system retraining. In addition to high cost, manual update also takes time to implement causing serious delay since the risk control administrator generally does not update the risk identification rules until a new means of property theft causes harm which is severe enough to attract the attention of the risk control administrator. Retraining the system causes even more serious delay. This is because retraining the risk identification system requires offline learning, and the cycle is often as long as several months. However, after several months, a new means of property theft will be developed by the unauthorized users, so the value of system retraining will be greatly reduced. The existing methods for risk identification have serious delay in dealing with new on-line risks, thus causing the existing risk identification system to always lag behind the unauthorized users. The existing technologies are very passive against hackers and often fail to prevent the increased on-line risks in time.

However, the methods for risk identification provided in this application can dynamically adjust various risk parameters in a timely and on-line manner in response to the unauthorized users' challenge to the risk identification system in the on-line risk competition, which is equivalent to using the persistent trying of the unauthorized users for on-line training of the risk identification system. A risk parameter corresponds to an operation hopping event. A risk identification system analyzes a risk of the operation hopping event involved in each transaction according to a set of risk parameters, and comprehensively identifies the risk of the transaction. In other words, the risk parameters are a specific form of the risk identification rules, and the risk identification rules are updated after the risk parameters are adjusted.

In some embodiments, even if the unauthorized users occasionally succeed, the risk identification system can be updated by adjusting the risk parameters in a timely manner (requiring one day at most), and a new means of property theft developed by the unauthorized users can be identified in a next unauthorized transaction. In addition, as the risk parameters can be dynamically adjusted on line, it would be increasingly difficult for the unauthorized users to crack the risk identification system.

A core concept of this application is to discretize a transaction into a series of operation hopping events (explained below) which can be independently evaluated for the possibility of transaction being legitimate. Since the operation performed by both the user and the unauthorized users after logging onto a client using the user identifier of the user can be discretized into a series of most basic operation hopping events, the possibility of occurrence of a current transaction can be evaluated by respectively evaluating the possibility of occurrence of each operation hopping event involved in the transaction, thus realizing the risk identification for the current transaction. Further, by adjusting a risk parameter corresponding to at least one operation hopping event in a predetermined set of operation hopping events corresponding to each user identifier, the possibility of occurrence of the operation hopping event can be adjusted, so as to adjust a logic or strategy of the risk identification rules for the risk identification system.

However, in the existing methods for risk identification, because the logic of the risk identification rules set up artificially or obtained by machine learning is closed, the risk identification rules cannot be adjusted, and the risk identification rules can only be added or replaced under the condition that the risk identification system is taken offline, which causes serious delay and high cost.

In some embodiments, the methods for risk identification as claimed can achieve real-time memory of on-line risks by dynamically adjusting the risk parameters according to the operation data of each transaction. The risk identification system can learn adaptively and rely less on human intervention. In addition, the risk identification system can be maintained in a "gaming" state with the unauthorized users, the accuracy of each risk parameter in the set of risk parameters is also tested in time. In this way, the risk identification system can identify risks more accurately and even predict on-line risks.

The technical solution provided by various embodiments will be described in detail below with reference to the accompanying drawings.

FIG. 1 is a flowchart of a method for adjusting a risk parameter according to embodiments of this application. The method including the following steps.

At S101, a payment request is received. The method can be executed by a control server of a service provider providing electronic transaction services. The control server interacts with a client installed on a terminal device of each user, receives a payment request sent by the client, sends instructions to the client, such as sending an instruction to the client for freezing a transaction, and instructs the client to display a message, e.g., "Transaction Frozen" on a screen of the terminal device.

In some embodiments, a risk identification system may be deployed on the control server. The risk identification system is used for risk identification according to the payment request. In addition to supporting on-line self-learning and self-adjustment of risk parameters, the risk identification system also supports manual updating of the risk parameters by a risk control administrator, as well as offline training.

In some embodiments, the payment request contains a user identifier and operation data generated in a current transaction using the user identifier. The user identifier may be a user identifier for logging onto the client (an account of the user). The operation data may include: operations performed by a person performing the current transaction using the user identifier, a time of the current transaction, merchant information involved in the current transaction, logistics information, an amount to be paid, data generated by interactions between a terminal device used in the current transaction and the outside world, etc. In some embodiments, all the data involved in the current transaction which can be obtained by the client can be the operation data.

Communication protocols involved in the payment may include, for example, near field communication (NFC), WiFi, 3G/4G/5G, point of sale (POS) card swiping technology, two-dimensional code scanning technology, barcode scanning technology, Bluetooth, infrared, short message service (SMS), multimedia message service (MMS), etc.

At S102, according to the operation data, at least one operation hopping sequence produced in the current transaction is determined.

In some embodiments, the operation hopping sequence may be a sequence containing at least one operation hopping event. A plurality of operation hopping events contained in an operation hopping sequence are logically connected. For example, the operation hopping sequence contains operation hopping events T1, T2, and T3. In one transaction, T1, T2, and T3 occur one after the other. For example, T2 occurs only after T1, and T3 occurs only after T2.

An operation hopping event may be the occurrence of a behavior or an event of a transition between two states. For example, "clicking on a link in the client" is an operation hopping event, which can be "a behavior of clicking on a link occurs" or "transiting from a state where a link is not clicked to a state where the link is clicked." For convenience of description, an operation hopping event will be described below as an event of a transition between two states.

For example, a first user opens a client to participate in a transaction, clicks on a purchase link in the client, and clicks on a "payment" button in a pop-up payment page to generate a payment request. A control server then receives the payment request, which contains a user identifier of the first user and operation data generated in the current transaction using the user identifier of the first user. For example, the operation data includes "the first user used an iPhone® of the second user (Serial Number: f2154) to log onto the client with an account of the first user at 17:20 on Jan. 5, 2016, clicked on a purchase link of a Nike® store and requested purchase of a pair of sneakers for 500 yuan at 18:05 on Jan. 5, 2016." According to the operation data, at least one operation hopping sequence can be determined, and the operation hopping sequence may indicate the probability that the first user himself is the current user of the account of the first user. For example, three operation hopping sequences can be determined, including how the operation was performed with the account of the first user (sequence 1), when the operation was performed with the account of the first user (sequence 2), and a number of times that the iPhone® f2154 is used to log on the client with the account every day (sequence 3). From these three operation hopping sequences, the probability that the first user himself is the current user of the account of the first user can be determined. For example, the operation hopping sequence 1 contains the following operation hopping events: the first user clicked on the purchase link of Nike® store and clicked on the payment button of a pair of sneakers. The operation hopping sequence 2 contains the following operation hopping events: the first user clicked on the purchase link at 17:20 on Jan. 5, 2016, and clicked on the payment button at 18:05 on Jan. 5, 2016. The hopping sequence 3 contains the following operation hopping events: the account of the second user was logged out from the iPhone® f2154, and the account of the first user was logged onto the iPhone® f2154.

For example, for the operation hopping event "the first user clicked on the payment button of a pair of sneakers" contained in the operation hopping sequence 1, the operation hopping event corresponds to the transition between two states, namely, state 1 "payment button not clicked" transitioning to state 2 "payment button clicked". For another example, for the operation hopping event "the account of the second user was logged out from the iPhone® f2154" contained in the operation hopping sequence 3, the operation hopping event corresponds to the transition between two states, namely, state 1 "the account of the second user was active on the iPhone® f2154" transitioning to "the account of the second user was not active on the iPhone® f2154".

Similarly, each operation hopping event in the operation hopping sequences can correspond to a transition between two states as explained above and will not be described again.

The relationship among the operation data, the operation hopping sequences and the operation hopping events (transiting from one state to another) is explained above. That is, for a current transaction initiated using a user identifier, at least one operation hopping sequence involved in the current transaction can be determined according to operation data involved in the current transaction. Operation hopping events contained in the operation hopping sequence can be determined according to each operation hopping sequence involved in the current transaction.

A core concept of the illustrated technical solutions includes that operation data related to one transaction is converted into at least one operation hopping sequence. Each operation hopping sequence further includes at least one operation hopping event. Each operation hopping event corresponds to a risk parameter. As such, the operation data related to one transaction can be discretized into a plurality of independent operation hopping events. With respect to various user identifiers registered on a client providing electronic transaction services, a set of various risk parameters may be assigned each user identifiers such that real-time, on-line updating of the various risk parameters is supported. In this way, once an unauthorized user obtains the user identifier of a user and initiates a payment request to the control server on the client through the user identifier, even if the unauthorized users temporarily deceive the risk identification system and cause property losses to the user, the control server can timely, dynamically update the risk parameters corresponding to each operation hopping event involved in the transaction initiated through the user identifier on line according to the operation data contained in the payment request, without waiting for manual updates or offline retraining of the risk identification system.

In some embodiments, the technical solutions provided herein includes determining the at least one corresponding operation hopping sequence according to the operation data generated in the current transaction through the user identifier, and determining all operation hopping events involved in the current transaction for risk identification and risk parameter adjustment of the current transaction.

In some embodiments, the method disclosed herein treats a major event as at least one operation transfer sequence. That is, a major event can be discretized into a plurality of operation hopping events in the reinforcement learning theory. A plurality of operation hopping events can be extracted from the operation data of a major event, and a machine is employed to determine the probability of occurrence corresponding to each operation hopping event through repeated trial and error, so as to make decisions on the major event according to the probability of occurrence of each operation hopping event.

In some embodiments, as inspired by the reinforcement learning theory, various events which may occur in a transaction are discretized into a series of operation hopping events, and the probability of occurrence corresponding to each operation hopping event is used as initial risk parameters. When a transaction occurs, the risk identification system can analyze each operation hopping sequence involved in the transaction, to determine the relevant operation hopping events. The probabilities of occurrence corresponding to the operation hopping events involved in the transaction are determined from the set probabilities of occurrence. The probabilities of occurrence corresponding to the operation hopping events involved in the transaction are comprehensively considered to determine whether the transaction is reasonable and identify the risk of the transaction.

At S103, a risk parameter corresponding to the operation hopping event contained in the operation hopping sequence is obtained from a set of risk parameters corresponding to the user identifier.

In some embodiments, the risk parameter may be the probability of occurrence used in a machine reinforcement learning method, or may be a parameter obtained by risk control administrator encrypting the risk probability using some encryption algorithm in order to prevent the risk parameter from being cracked. Any parameter which can be used to analyze the possibility of occurrence of the operation hopping events can be the risk parameter. In some embodiments, adjusting the risk parameters means adjusting the risk identification rules on which the risk identification system relies.

In some embodiments, before S101, the risk identification system deployed on the control server may be initialized. For each registered user identifier, a set of operation hopping events corresponding to the user identifier may be determined, and an initial value may be assigned to a risk parameter corresponding to each operation hopping event corresponding to the user identifier.

For example, different nodes (i.e. different states) may be defined, operation hopping between two different nodes (i.e. transition between two different states) may be traversed to obtain a plurality of operation hopping events. The plurality of operation hopping events may be included in the set of operation hopping events. It is worth noting that each user identifier corresponds to a set of operation hopping events.

An initial value may be randomly assigned to the risk parameter corresponding to each operation event in the set of operation hopping events, so that the risk parameter corresponding to each operation event for a user using the corresponding user identifier is constantly updated based on the user's attributes in the risk identification system.

In some embodiments, the initial value of each risk parameter may also be determined according to the individual user's attributes using the user identifier. For example, historical operation data generated through the user identifier may be obtained. For each operation hopping event contained in the set of operation hopping events, the probability of occurrence of the operation hopping event is determined according to the historical operation data, and the probability of occurrence is used as the initial value of the risk parameter for the operation hopping event.

For operation hopping events not included in the historical operation data, reference values may be assigned to the probabilities of occurrence of these operation hopping events. According to the methods for risk identification, these probabilities of occurrence will be gradually adjusted to fit individual user's attributes.

When the historical operation data generated using the user identifier cannot be obtained, historical operation data generated by a set number of other user identifiers is obtained. For each operation hopping event contained in the set of operation hopping events, the probability of occurrence of the operation hopping event is determined according to the historical operation data, and the probability of occurrence is used as the initial value of the risk parameter corresponding to the operation hopping event.

That is, for a newly registered user identifier, since historical operation data corresponding to the user identifier cannot be obtained, historical operation data corresponding to other registered user identifiers can be used as the historical operation data, The probability of occurrence of each hopping event in a set of hopping events corresponding to the new user identifier can be determined according to the historical operation data.

After assigning initial values to the set of risk parameters in the risk operating system, to identify future risk identification for various transactions, risk parameters contained in the set of risk parameters may be obtained by adjusting the risk parameters used for risk identification in the previous transaction according to the operation data generated in the previous transaction corresponding to the user identifier.

In some embodiments, in a method for risk identification for the current transaction, the set of risk parameters on which risk identification is based includes the latest set of risk parameters obtained by adjusting the set of risk parameters from performing risk identification on the previous transaction. The adjusted set of risk parameters is used for risk identification of the next transaction.

At S104, the obtained risk parameter is adjusted according to the at least one operation hopping sequence.

In some embodiments, when the operation hopping sequences involved in the current transaction are determined by analyzing the current transaction, the operation hopping events involved in the current transaction are also determined. Then, as mentioned earlier, since the risk parameters corresponding to each operation hopping event have been comprehensively established in the set of risk parameters, the risk parameters corresponding to each operation hopping event involved in the current transaction may be determined from the set of risk parameters. A risk value of the operation hopping sequence may be determined according to the risk parameters (which may be probability of occurrence) corresponding to each operation hopping event involved in the current transaction. After determining the risk value of each operation hopping sequence of the current transaction, the final risk degree of the current transaction may be determined.

In the illustrated embodiments, at least one operation hopping sequence is determined according to the operation data, then the risk value of each operation hopping sequence is determined, and finally the risk degree of the current transaction is determined according to the risk value of each operation hopping sequence. The techniques do not directly determine the risk degree according to all operation hopping events involved in the operation data. This is because the operation hopping sequence can reflect a transaction logic reflected by the operation data of the current transaction, while a single operation hopping event cannot reflect the transaction logic of the current transaction. The operation hopping sequence that includes the operation hopping events in a certain sequence has the transaction logic. The analysis of the current transaction includes analyzing the current transaction logic, and the risk identification of the current transaction is a judgment on whether the current transaction logic is reasonable. Therefore, even two operation hopping sequences containing the same operation hopping events may correspond to different risk values due to different occurrence sequences of the operation hopping events.

In the embodiments of this application, the obtained risk parameters respectively correspond to the operation hopping events involved in the current transaction. The risk degree may be a numerical value, which is obtained by integrating the risk values of each operation hopping sequence involved in the current transaction, or may be a grade, which is evaluated after integrating the risk values of each operation hopping sequence involved in the current transaction.

After determining the risk degree of the current transaction, the risk identification system may determine the risk probability of the current transaction according to the risk degree, and may also classify the current transaction as safe or unsafe according to the risk degree. In this specification, the risk value, risk degree and an output result of risk identification may be presented by other forms and are not limited to the specific examples provided herein.

In some embodiments, based on the risk degree of the current transaction, when the risk degree corresponding to the current transaction is higher than a threshold value, the obtained risk parameter may be decreased, and when the risk degree corresponding to the current transaction is not higher than the threshold value, the obtained risk parameter may be increased. The threshold value may be a preset value provided by the risk control administrator as the maximum controllable risk degree. If the risk degree of the current transaction is higher than the threshold value, it indicates that the risk of the current transaction is high, which indicates the rationality of the occurrence of the operation hopping event involved in the current transaction should be estimated as low. That is, an operation hopping event with a low probability of occurrence is an event that the risk control administrator would consider to have a low possibility of occurrence in a safe transaction.

Similarly, if the risk degree of the current transaction is lower than the threshold value, then the risk of the current transaction is not high, and the occurrence of the operation hopping event involved in the current transaction is reasonable and meets the established expectation. In other words, the operation hopping event involved in the current transaction is probably caused by the operation of the user rather than by the unauthorized users. The risk parameter corresponding to the operation hopping event involved in the current transaction may remain unchanged or be increased.

In the illustrated embodiments, the obtained risk parameter may also be adjusted not according to the risk degree of the current transaction, so there is no need to wait for the determination of the risk degree. The risk parameter corresponding to each operation hopping sequence may be adjusted according to the risk value of the operation hopping sequence. For example, an operation hopping sequence with a high risk value may also indicate that when considering all the operation hopping events contained in the operation hopping sequence, the probability of occurrence is low overall.

For example, an operation hopping sequence contains operation hopping events T1, T2, T3, T4 and T5. The sequence of occurrence of the operation hopping events is T1, T4, T3, T5 and T2, for the first user. The probability of occurrence (risk parameter) of T1 is 0.9, the probability of occurrence of T2 is 0.8, the probability of occurrence of T3 is 0.1, the probability of occurrence of T4 is 0.05, and the probability of occurrence of T5 is 0.15. Even if the probabilities of occurrence of T1 and T2 are high, but the probability of T1, T4, T3, T5, T2 occurring at the same time in this order is very low. The risk value of the operation hopping sequence is high.

In some embodiments, one operation hopping event may be defined according to each operation of the user. One operation hopping event may also be defined according to the transition of two states involved in the transaction, or one operation hopping event may also be defined according to other dimensions besides that of the user, such as the dimension of a terminal device (device dimension) used by the user, the dimension of a designated merchant in the current transaction, the dimension of the current location of the user, and other available dimensions. For example, "the first user clicked on the purchase link" or "the purchase link was not clicked→(e.g., transitioning to) the purchase link was clicked" may be an operation hopping event. "The mobile phone did not scan a two-dimensional code→the mobile phone scanned a two-dimensional code" may be an operation hopping event. "The Nike® store sold 1 pair of sneakers per minute→the Nike® store sold 10 pairs of sneakers per minute" may be an operation hopping event.

In short, this specification does not limit how to define an operation hopping event. The embodiments include discretizing one transaction into a series of operation hopping events which can be independently evaluated, so as to adjust a strategy of the risk identification system by adjusting the risk parameters of each operation hopping event.

For the same reason, this specification does not limit what specific algorithm or method is used to calculate and generate a risk parameter for each operation hopping event, the risk value of each operation hopping sequence, and the risk degree of the current transaction. The risk control administrator can flexibly make a decision according to business conditions.

Through the method for risk identification shown in FIG. 1, the risk parameters corresponding to each user identifier are respectively set for each user identifier registered on the client providing electronic transaction services. On-line, real-time updating of the risk parameters is supported. In this way, once the unauthorized users obtain the user identifier of a user and initiates a payment request to the control server on the client through the user identifier, even if the unauthorized users temporarily crack the risk parameters corresponding to the user identifier and cause property losses to the user, the control server can timely, dynamically update the risk parameters corresponding to the user identifier on line according to the operation data contained in the payment request, without waiting for manual updates or offline retraining of the risk identification system. Moreover, the high-cost manual update is avoided, and risk parameters can be dynamically updated on line without waiting for several months for a risk identification system to be retrained, thus updating the risk identification system in a timely manner. Further, self-learning of the risk identification system is realized by dynamically adjusting the risk parameters in the set of risk parameters on line.

In addition, the existing methods for risk identification also identifies risks with low accuracy. The existing methods for risk identification have obvious limitations, that is, the client and the control server rely on certain risk identification rules to identify risks of transactions initiated by different users in an across-the-board manner.

For example, as mentioned in the background technology, in the existing methods for risk identification, the risk identification rules used by the client and the control server for risk identification are common rules applicable to all users. However, each user has his/her own characteristics that the common risk identification rules would not apply to. For example, some users like to overdraft for consumption and often spend 80% or more of the bank card balance. For another example, some users, though under 25 years old, have strong financial ability and have a high probability of wiring over RMB 5,000 yuan at a time. For these users, the existing methods for risk identification may be inaccurate.

Even if both expert experience and historical operation data are provided to the risk identification system for training, although the accuracy of risk identification may be improved to a certain extent, the problems mentioned in the background technology still exist, and the accuracy of existing methods for risk identification, which fail to consider individual user's attributes, is still not high.

That is to say, although by collecting a large amount of historical operation data generated by each user, the risk identification rules applicable to each user can be extracted from the operation data. Since the transaction habits of the users vary greatly and the daily transaction occasions of the users are not fixed, one risk identification rule applicable to different users is often rough, which is bound to omit some individualized transaction occasions of the users.

For example, a risk identification rule may include "transactions involving transfers of RMB 5,000 yuan or more are not safe between 12:00 a.m. and 7:00 a.m." According to general experience, it does not fit to common sense to make large amounts of on-line transfers between 12:00 a.m. and 7:00 a.m. So this risk identification rule is generally accurate. However, in modern society, people have varying work-rest schedules. Some users are just active at night, so it is possible to make large amounts of on-line transactions between 12:00 a.m. and 7:00 a.m. For these users, this risk identification rule is inaccurate. If the transactions made by these users are frozen according to this risk identification rule, it would cause troubles to the users.

For this reason, in some embodiments, an individualized risk identification strategy is customized for each user using the client providing electronic transaction services by setting a set of risk parameters for each user identifier. As the set of risk parameters corresponding to each user identifier is customized, the risk identification rules relied on by the risk identification system fit the individualized characteristics of each user, thus improving the accuracy of risk identification for the user. Moreover, it is more difficult for the unauthorized users to bypass the risk identification system. The unauthorized users not only need to obtain the user identifier of the user, but also must have a certain understanding of the daily transaction habits of the user to successfully conduct unauthorized transactions.

It is worth noting that experiments show that if only the individualized transaction habits of the users are examined for risk identification, the accuracy of risk identification is still not high. The transaction habits of a user are analyzed according to the historical transactions of the user on the client through the corresponding user identifier in advance as the risk identification rule corresponding to the user identifier. When a user performs on-line transactions through the user identifier, whether the user is the user corresponding to the user identifier can be judged according to the instant transaction operation performed through the user identifier. The accuracy of risk identification based on this method is still not high. The reasons are explained below.

First, although the individualized risk identification rules overcome the defects of the "across-the-board" approach and rough risk identification rules in the existing technologies, a new drawback is caused. That is, the individualized risk identification rules are poor in stability. Risk identification rules in the existing technologies obtained by refining the common transaction habits of user groups based on business common sense and statistics, though rough and hard to adapt to the individualized transaction occasions of different users, are statistically stable (the common transaction habits of most users can be refined into common risk identification rules). On the contrary, the individualized risk identification rules are obtained according to the transaction habits of a certain user. Individual transaction habits are not statistically stable like group transaction habits. The individualized risk identification rules are more specific and detailed. However, individuals often change transaction habits under the influence of emotions or unexpected events, thus causing the individualized risk identification rules to be easily distorted and unstable.

For example, the first user used to eat at McDonald's downstairs of the company at noon and pay on line through a client. But occasionally he is too busy to go downstairs and has to order takeout from other restaurants through the client, or the first user has gotten tired of eating western fast food recently and has eaten Chinese food for several consecutive days and paid on line through the client. The payment behavior of the first user for eating Chinese food for several consecutive days is likely to be judged as unsafe transaction behavior according to the risk identification rules for the first user in terms of on-line transaction obtained based on historical data, but in fact, the account of the first user was not stolen.

Secondly, compared with mobile phones, accounts and passwords used by users on clients are more likely to be stolen. In reality, a large number of on-line property theft cases are caused by accounts and passwords being stolen. Moreover, once logging onto the client with the account and password of the user, an unauthorized user can also see the transaction records of the user and imitate the transaction habits of the user to make unauthorized payments and transfers, which are hardly covered by the risk identification rules obtained according to the historical transaction habits of the users.

In view of the above, in some embodiments, at least one other dimension of examination is included for risk identification besides the transaction habits of the users, so as to enhance the reliability of risk identification.

Generally speaking, the dimensions involved in one transaction by the user may include: a user identifier (corresponding to individualized transaction habits), a terminal device (according to the habits of the user using the terminal device, rules of data exchange between the terminal device and the outside world can be obtained), a merchant (merchant involved in the current transaction), a location (location of the current transaction), logistics (logistics address, consignee information, etc. specified in the current transaction), a medium (current network environment), etc.

The methods for risk identification as provided in this specification can also comprehensively identify the risk of the current transaction by examining the risk degree of the current transaction through the user identifier from at least two dimensions. In some embodiments, a risk identification system performs risk identification in at least two dimensions, and performs overall risk identification according to the weight of each dimension. This solution can realize individualized risk identification, and use multiple dimensions in the transaction to minimize errors caused by the individualized risk identification rules, enhance the stability of the risk identification system, and thus improve the accuracy of risk identification.

The technical solution can also adopt other dimensions to examine the current transaction, and the way to examine the current transaction in multiple dimensions may not be limited to the above examples. The embodiments provides that the risk of the current transaction performed through the user identifier can be examined from at least two dimensions. Other methods for risk identification based on multiple dimensions will be described below with reference to the attached drawings.

Figure 2:
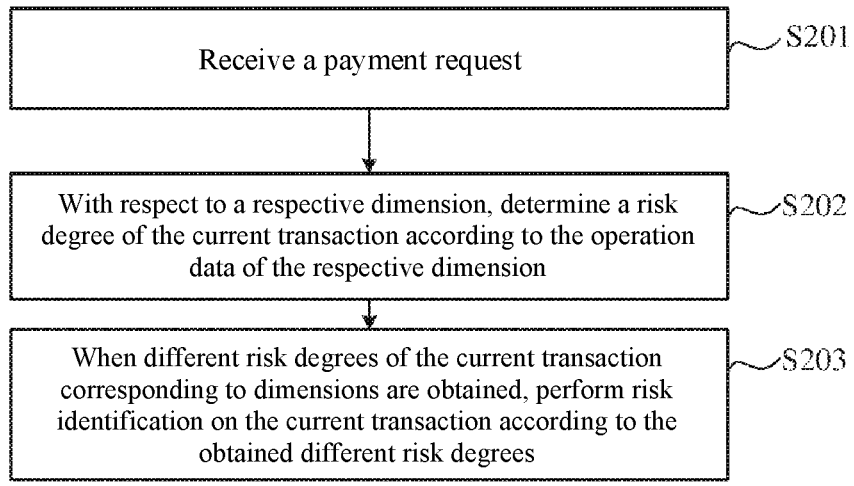
FIG. 2 is a flowchart of a method for risk identification according to one embodiment of this application.

FIG. 2 is a flowchart of a method for risk identification according to embodiments of the present specification. The method includes the following steps.

At S201, a payment request is received. In some embodiments, the payment request may carry operation data of at least one dimension generated in a current transaction, and may also carry a user identifier and operation data generated in the current transaction through the user identifier.

At S202, with respect to each dimension, a risk degree of the current transaction is determined according to the operation data of the dimension.

As mentioned earlier, at least the following dimensions can be involved in one transaction by a user including: the user identifier (corresponding to individualized transaction habits), the terminal device (according to the habits of the user using the terminal device, the rules of data exchange between the terminal device and the outside world are obtained), the merchant (the merchant involved in the current transaction), the location (the location of the current transaction), the logistics (logistics address, consignee information, etc. specified in the current transaction), and the medium (current network environment).

For example, the operation data of at least one dimension of the user identifier may be: the operation data of the user identifier in the terminal device dimension involved in the current transaction, such as a number of accounts logged on through the terminal device every day; or the operation data in the user identifier dimension involved in the current transaction, such as the daily purchase habits of the first user, and a series of action habits that the first user usually performs after logging onto the client; or the operation data in the merchant and location dimensions involved in the current transaction, such as the characteristics of customers traded with the merchant every day, and the characteristics of users who often trade near the location.

The user identifier (account) dimension can reflect the individualized transaction habits of the user. When unauthorized users obtain the account of the user for transaction, a risk identification system can identify the risk from the user identifier dimension. However, for reasons explained above, the accuracy of risk identification performed only from the user identifier dimension is not sufficiently high.

In some embodiments, the terminal device dimension can be used as a good supplement to improve the accuracy of risk identification. In contemporary society, terminal devices, such as mobile phones, are so popular that people almost never put them down, so they can hardly be stolen. Moreover, even if a mobile phone is stolen, the unauthorized users can hardly have access to the client in an operating system of the mobile phone to make unauthorized payments or transfers due to a password-locked screen interface of the mobile phone. Therefore, the unauthorized users often obtain the user identifier of the user by means of the network hacking techniques and use the user identifier on other terminal devices. That is to say, even if the unauthorized users can use the stolen user identifier to imitate the transaction habits of the user on other terminal devices for unauthorized transactions, the unauthorized users may not be able to use the terminal device often used by the user, thus easily exposed as an unlawful user. The transactions can be identified as abnormal by the risk identification system from the terminal device dimension.

It is found that by combining the terminal device dimension and the user identifier dimension and according to business experience, giving different weights in risk identification to the two dimensions to form "double insurance" can effectively improve the accuracy of risk identification.

For example, the habit of the first user of using his iPhone® (having a serial number A) is that no more than two accounts logged onto the client on the iPhone® A daily. The unauthorized users often use their own mobile phone to log on with different accounts frequently for unauthorized transactions. If the unauthorized users obtain the account of the first user, log on with the account of the first user with their own iPhone® B, imitate the transaction habits of the first user, and spend money at merchants where the first user often go, then even from the user identifier dimension, the risk identification system would not be to identify the risk of this transaction. From the terminal device dimension, the risk identification system can identify that iPhone® B through which the account of the first user is logged on in the current transaction is not iPhone® A usually used by the first user, and there are many accounts logged on through iPhone® B every day. The risk identification system can determine that iPhone® B is probably a terminal device used by the unauthorized users to conduct unauthorized transactions, and the current transaction is identified as a high-risk transaction in the terminal device dimension. In addition, the risk identification system can adjust a set of risk parameters of the terminal device dimension corresponding to the user identifier of the first user according to the operation data of the current transaction performed by the unauthorized users, so that the proportion of the risk parameter "a number of accounts logged onto the client on iPhone® A daily does not exceed two" in risk identification is increased.

Moreover, the merchants involved in unauthorized transactions are often merchants to whom the unauthorized users sell stolen goods, which makes merchants as a dimension to help to judge the probability that a merchant involved in the current transaction is the merchant to whom the unauthorized users sell stolen goods. For example, an average daily sales amount of a jewelry store A is RMB 500,000 yuan. But when a daily sales amount of the store A is a stable RMB 2 million yuan for a certain period of time, it is suspected that there may be criminals selling stolen goods on line in a concentrated way. If the account of the first user is stolen by the same group of criminals during this period of time, the risk identification system may determine that the account of the first user is at a high risk of theft from the merchant dimension when detecting that the merchant involved in the current transaction is jewelry store A. That is, a high risk degree is output from the merchant dimension.

Similarly, from the logistics dimension, it can be identified whether the difference between the logistics information specified by the current transaction and the logistics information specified by the user at ordinary times is too large. From the media dimension, it can be identified whether the network environment of the current transaction is WiFi or mobile data, whether the service provider of the mobile data is China Mobile, China Unicom or China Telecom, and whether the difference between this information and the usual media information of the user is too large.

In some embodiments, for each of the above dimensions, a risk degree of the current transaction can be determined according to the operation data of the dimension. For example, the method for adjusting the risk parameter shown in FIG. 1 and the method for risk identification can be adopted to determine the risk degree according to the operation data and perform risk identification. For example, at least one operation hopping sequence of the device dimension generated in the current transaction can be determined according to the operation data of the dimensions (any one of device dimension, user dimension, merchant dimension and location dimension). The operation hopping sequence of the device dimension contains at least one operation hopping event of the device dimension. A risk parameter corresponding to the operation hopping event of the device dimension contained in the operation hopping sequence of the device dimension is determined according to the at least one operation hopping sequence of the device dimension. According to the risk parameter, the risk degree of the current transaction is determined.

Still referring to FIG. 2, at S203, when risk degrees of the current transaction corresponding to each of the dimensions are obtained, perform risk identification on the current transaction according to the obtained different risk degrees.

In some embodiments, different risk degrees obtained can be calculated according to specific strategy rules to obtain a risk coefficient of the current transaction, and risk identification can be performed on the current transaction according to the determined risk coefficient.

The specific strategy rules may including setting different weights for different risk degrees and aggregating the risk degrees to obtain the risk coefficient, or may simply add the risk degrees to obtain the risk coefficient. In short, the specific strategy rules may integrate different risk degrees to reflect the risk of the current transaction.

The method shown in FIG. 2 and the method shown in FIG. 1 are based on the same inventive concept. The way to determine the risk degree in each dimension in the method shown in FIG. 2 is similar to that in the method shown in FIG. 1, except that in the method shown in FIG. 2, the risk degree of the current transaction can be determined from more than one dimension, and the risk degrees in different dimensions can be further integrated for risk identification.

When performing risk identification on the current transaction employing more dimensions examined, the accuracy of risk identification becomes higher. Moreover, the risk identification system can identify the risk of the current transaction holistically according to the determined risk results of each dimension.

In the method for risk identification shown in FIG. 2, when the server receives the payment request of the current transaction, the method for risk identification shown in FIG. 1 is executed once in each of at least two dimensions. The risk degree in each dimension is output, and the risk of the current transaction can be determined according to the risk degree in each dimension (for example, the risk degrees in different dimensions are normalized to determine the risk probability of the current transaction), thus realizing the risk identification of the current transaction. The risk parameters in each dimension may also be adjusted according to the transaction characteristics of the respective dimension.

Figure 3:
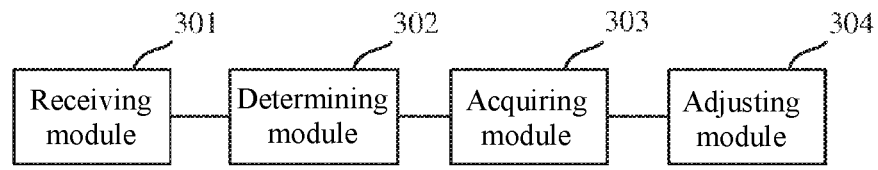
FIG. 3 is a block diagram of a device for adjusting a risk parameter according to one embodiment of this application.

Based on the method for adjusting the risk parameters shown in FIG. 1, in some embodiments, a device for adjusting a risk parameter is provided in FIG. 3. The device includes: a receiving module 301, a determining module 302, an obtaining module 303, and an adjusting module 304.

The receiving module 301 is configured to receive a payment request. The payment request contains a user identifier and operation data generated in a current transaction using the user identifier.

The determining module 302 is configured to determine, according to the operation data, at least one operation hopping sequence produced in the current transaction. The operation hopping sequence contains at least one operation hopping event.

The obtaining module 303 is configured to obtain, from a set of risk parameters corresponding to the user identifier, a risk parameter corresponding to the operation hopping event contained in the operation hopping sequence. Risk parameters contained in the set of risk parameters are obtained by adjusting risk parameters used for risk identification in a previous transaction according to operation data generated in the previous transaction corresponding to the user identifier.

The adjusting module 304 is configured to adjust, according to the at least one operation hopping sequence, the obtained risk parameter.

In some embodiments, the device further includes an identifying module 305 which determines a risk degree of the current transaction according to the obtained risk parameter and the at least one operation hopping sequence, and performs risk identification on the current transaction according to the risk degree.

The adjusting module 304 decreases the obtained risk parameter when determining that the risk degree corresponding to the current transaction is higher than a threshold value, and increases the obtained risk parameter when determining that the risk degree corresponding to the current transaction is not higher than the threshold value. The adjusted risk parameter is used for risk identification for the next transaction corresponding to the user identifier.

In some embodiments, the device further includes an initializing module 306 which determines a set of operation hopping events corresponding to the user identifier and the initial values of the risk parameters corresponding to the set of operation hopping events before receiving the payment request when the risk identification system is initialized.

The initializing module 306 defines different nodes and traverses operation hopping between the different nodes to obtain a plurality of operation hopping events. The operation hopping events contain two of the nodes. According to the plurality of operation hopping events, the set of operation hopping events is obtained.

The initializing module 306 obtains historical operation data generated through the user identifier. For each operation hopping event contained in the set of operation hopping events, probability of occurrence of the operation hopping event is determined according to the historical operation data and the probability of occurrence is used as the initial value of the risk parameter corresponding to the operation hopping event.

When the historical operation data generated through the user identifier cannot be obtained, the initializing module 306 obtains historical operation data generated by a set number of other user identifiers. For each operation hopping event contained in the set of operation hopping events, probability of occurrence of the operation hopping event is determined according to the historical operation data and the probability of occurrence is used as the initial value of the risk parameter corresponding to the operation hopping event.

The identifying module 305 determines the operation hopping events contained in each operation hopping sequence, and determines the risk value of the operation hopping sequence according to the risk parameter corresponding to each operation hopping event. After obtaining a risk value of each operation hopping sequence, the identifying module 305 determines the risk degree of the current transaction according to the risk value of each operation hopping sequence.

Figure 4:
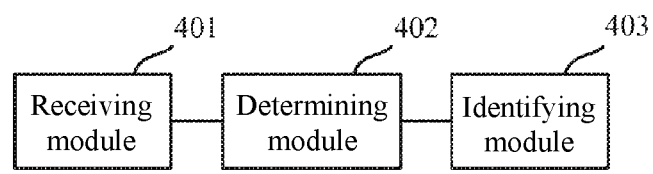
FIG. 4 is a diagram of a device for risk identification according to one embodiment of this application.

Based on the method for risk identification shown in FIG. 2, a device for risk identification is provided in FIG. 4. The device includes: a receiving module 401, a determining module 402, and an identifying module 403.

The receiving module 401 is configured to receive a payment request. The payment request contains operation data of at least one dimension generated in a current transaction.

The determining module 402 is configured to determine, with respect to a respective dimension, a risk degree of the current transaction according to the operation data of the respective dimension.

The identifying module 403 is configured to perform, when different risk degrees of the current transaction corresponding to dimensions are obtained, risk identification on the current transaction according to the obtained different risk degrees.

If the operation data of the dimension is the operation data of a device dimension, the determining module 402 determines at least one operation hopping sequence of the device dimension generated in the current transaction according to the operation data of the device dimension. The operation hopping sequence of the device dimension contains at least one operation hopping event of the device dimension. The determining module 402 further determines a risk parameter corresponding to the operation hopping event of the device dimension contained in the operation hopping sequence of the device dimension according to the at least one operation hopping sequence of the device dimension and determines the risk degree of the current transaction according to the risk parameter.

If the operation data of the dimension is the operation data of a user dimension, the determining module 402 determines at least one operation hopping sequence of the user dimension generated in the current transaction according to the operation data of the user dimension. The operation hopping sequence of the user dimension contains at least one operation hopping event of the user dimension. The determining module 402 further determines a risk parameter corresponding to the operation hopping event of the user dimension contained in the operation hopping sequence of the user dimension according to the at least one operation hopping sequence of the user dimension and determines the risk degree of the current transaction according to the risk parameter.

If the operation data of the dimension is the operation data of a merchant dimension, the determining module 402 determines at least one operation hopping sequence of the merchant dimension generated in the current transaction according to the operation data of the merchant dimension. The operation hopping sequence of the merchant dimension contains at least one operation hopping event of the merchant dimension. The determining module 402 further determines a risk parameter corresponding to the operation hopping event of the merchant dimension contained in the operation hopping sequence of the merchant dimension according to the at least one operation hopping sequence of the merchant dimension and determines the risk degree of the current transaction according to the risk parameter.

If the operation data of the dimension is the operation data of a location dimension, the determining module 402 determines at least one operation hopping sequence of the location dimension generated in the current transaction according to the operation data of the location dimension. The operation hopping sequence of the location dimension contains at least one operation hopping event of the location dimension. The determining module 402 further determines a risk parameter corresponding to the operation hopping event of the location dimension contained in the operation hopping sequence of the location dimension according to the at least one operation hopping sequence of the location dimension and determines the risk degree of the current transaction according to the risk parameter.

The identifying module 403 calculates different risk degrees obtained according to specific strategy rules to obtain a risk coefficient of the current transaction, and performs risk identification on the current transaction according to the determined risk coefficient.

Figure 5:
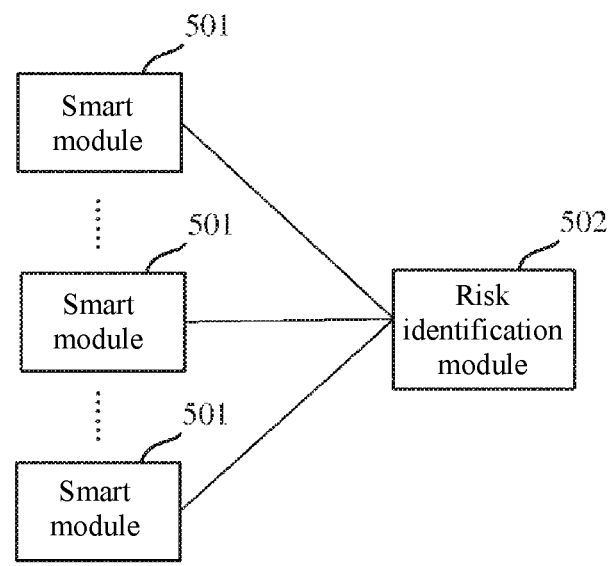
FIG. 5 is a block diagram of a risk identification system according to one embodiment of this application.

FIG. 5 is a block diagram of a risk identification system according to embodiments of this specification. The system includes: one or more smart module 501 and a risk identification module 502.

A smart module 501 is configured to obtain operation data generated in a current transaction through a user identifier, perform risk analysis according to the operation data, and send a risk analysis result to the risk identification module 502. The risk analysis result is obtained by the above methods for risk identification.

The risk identification module 502 is configured to perform risk analysis according to the received risk analysis result(s).

The smart module 501 is further configured to obtain the operation data generated in the current transaction through the user identifier, determine at least one operation hopping sequence according to the operation data, and send the at least one operation hopping sequence to an analyzing unit.

The smart module 501 is further configured to perform risk analysis according to the received operation hopping sequence, determine the risk degree according to the received risk analysis result, and send the risk degree to the risk identification module 502.

Figure 6A:
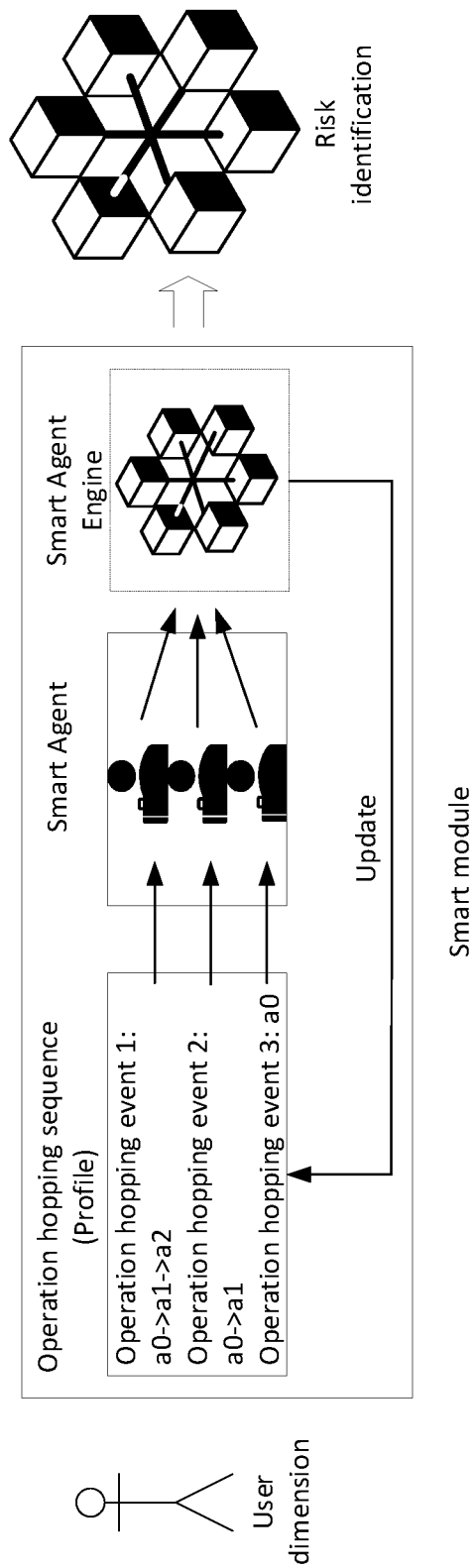
FIGS. 6A, 6B, 6C, and 6D are schematic diagrams of a risk identification system according to embodiments of this application.
Figure 6B:
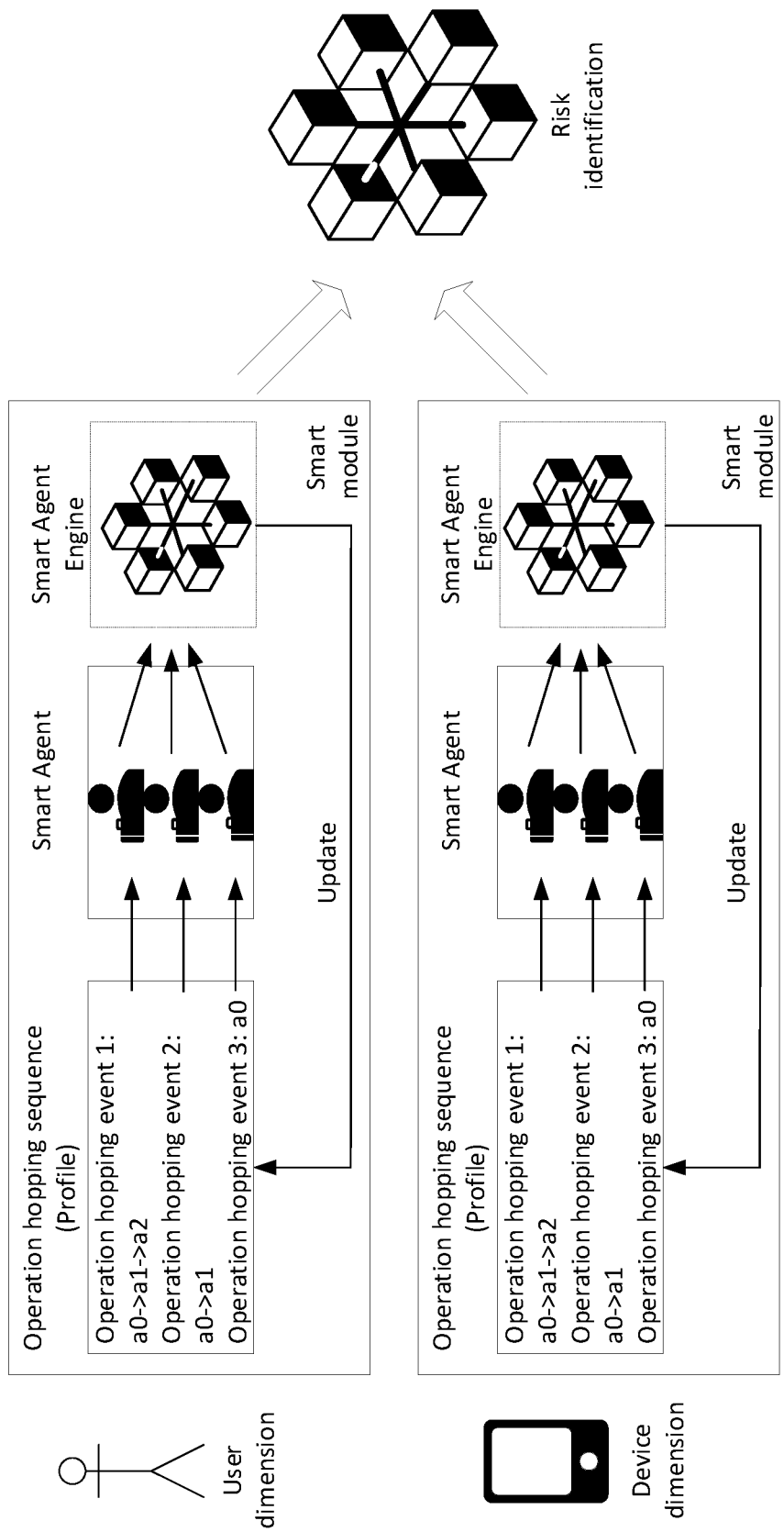
Figure 6C:
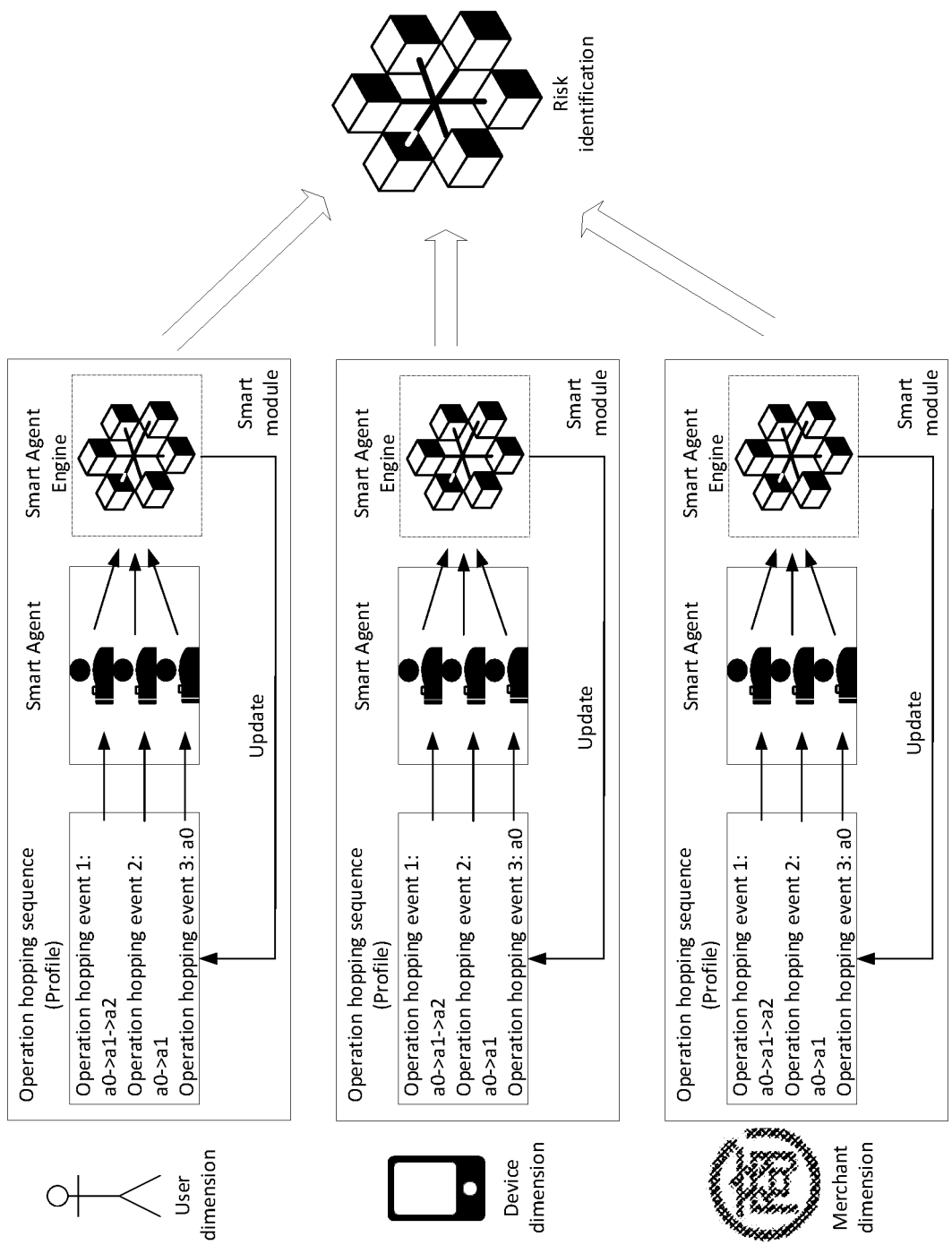
Figure 6D:
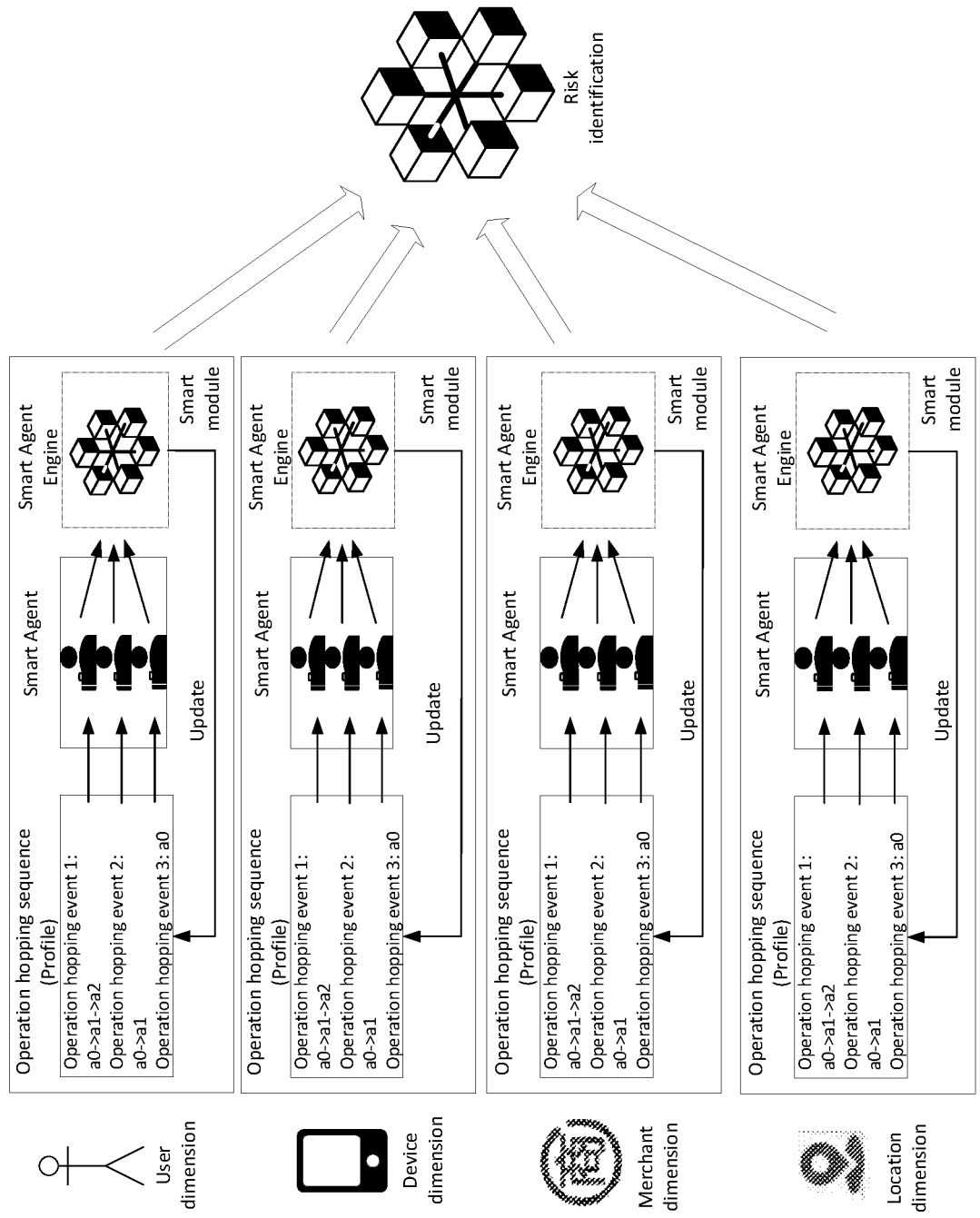

FIG. 6A, FIG. 6B, FIG. 6C, and FIG. 6D are schematic diagrams of a risk identification system according to embodiments of this specification. It is to be understood that the smart modules of the risk identification system shown in FIGS. 6A-6D corresponding to four dimensions including a user dimension (FIGS. 6A-6D), a terminal device dimension (FIGS. 6B-6D), a merchant dimension (FIGS. 6C-6D) and a location dimension (FIG. 6D). However, a number of dimensions shown in these figures are mere examples and do not constitute a limitation to the scope of this specification.

In FIG. 6A, the risk identification system can collect operation data of one dimension and identify whether there is risk in the current transaction according to the collected operation data. The specific identification method has been described in the above embodiments. The operation data of the dimension in FIG. 6(*a*) includes the operation data of the user dimension.

In FIG. 6B, the risk identification system can collect operation data of two dimensions and identify whether there is risk in the current transaction according to the collected operation data. The specific identification method has been described in the above embodiments. The operation data of two dimensions in FIG. 6B includes the operation data of the user dimension and the operation data of the device dimension.

In FIG. 6C, the risk identification system can collect operation data of three dimensions and identify whether there is risk in the current transaction according to the collected operation data. The specific identification method has been described in the above embodiments. The operation data of three dimensions in FIG. 6C includes the operation data of the user dimension, the device dimension and the merchant dimension.

In FIG. 6D, the risk identification system can collect operation data of four dimensions and identify whether there is risk in the current transaction according to the collected operation data. The specific identification method has been described in the above embodiments. The operation data of four dimensions in FIG. 6D includes the operation data of the user dimension, the device dimension, the merchant dimension and the location dimension.

In the risk identification system shown in FIGS. 6A-6D, an analyzing unit determines a risk value for each received operation hopping sequence, and outputs the risk value to the sending unit as a risk analysis result. The sending unit can determine the risk degree according to each received risk analysis result, send the risk degree to the risk identification module for final decision, and output a risk evaluation (e.g., risk probability) for the current transaction.

In the risk identification system shown in FIGS. 6A-6D, the smart modules can communicate and link with each other. For example, unauthorized users sell stolen goods to a certain merchant. After finding something unusual, the smart module corresponding to the merchant dimension can inform other smart modules of this new risk, and other smart modules can adjust their risk identification strategies in time according to this new risk. Because the risk identification system has this feedback mechanism between modules, the set of risk parameters of each module can updated in real time, such that the risk identification module can respond to the latest on-line risks more quickly and achieve risk identification more accurately.

The risk identification system shown in FIGS. 6A-6D is also robust. That is to say, since the risk identification system may include more than one smart module, when an abnormality occurs in one smart module, other smart modules will not be affected. The risk identification module may still receive the risk degree sent by at least one smart module for risk identification.

In addition, the risk identification system shown in FIGS. 6A-6D may also have a corresponding test system, i.e., adopting an AB Test on-line mode. The test system and the risk identification system have the same architecture, and the test system performs risk identification on transactions corresponding to a few user identifiers. When new risks occur, the test system may be first updated. After observing whether the performance of the test system is stable, a risk control administrator can decide whether to perform the same updates on the risk identification system.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. In addition, instead of making an integrated circuit chip manually, the programming is mostly implemented by using "logic compiler software, which is similar to the software compiler used to write programs. Original code before compiling is also written in a specific programming language, which is referred to as Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, Very-High-Speed Integrated Circuit Hardware Description Language (VHDL) and Verilog are most commonly used. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be specifically implemented by a computer chip or an entity or implemented by a product having a certain function. A typical implementation device is a computer. For example, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, in implementation of this application, the function of the units may be implemented in a same piece of or multiple pieces of software and/or hardware.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used for implementing each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may further be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may further be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, the computer device includes one or more processors (CPUs), an input/output interface, a network interface, and a memory.

The memory may include, among computer readable media, a non-persistent memory such as a random access memory (RAM) and/or a non-volatile memory such as a read-only memory (ROM) or a flash memory (flash RAM). The memory is an example of the computer-readable medium.

The computer-readable medium includes persistent, non-persistent, movable, and unmovable media that may implement information storage by using any method or technology. Information may be a computer-readable instruction, a data structure, a program module, or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application can be described in the general context of computer executable instructions executed by a computer, for example, a program module. Generally, the program module includes a routine, a program, an object, a component, a data structure, and the like for executing a particular task or implementing a particular abstract data type. This application can also be practiced in a distributed computing environment in which tasks are performed by remote processing devices that are connected through a communication network. In a distributed computing environment, the program module may be located in both local and remote computer storage media including storage devices.

The embodiments of the present disclosure are all described in a progressive manner. For same or similar parts in the embodiments, reference may be made to these embodiments. Each embodiment focuses on a difference from other embodiments. Especially, a system embodiment is basically similar to a method embodiment, and therefore is described briefly; for related parts, reference may be made to partial descriptions in the method embodiment.

The foregoing descriptions are merely embodiments of this application and are not intended to limit this application. For a person skilled in the art, various modifications and variations can be made to this application. Any modification, equivalent replacement, or improvement made without departing from the spirit and principle of this application shall fall within the scope of the claims of this application.

What is claimed is:

1. A computer-implemented method, comprising:
   determining, by a server, a first set of operation hopping events corresponding to a user identifier;
   determining, by the server, a probability value indicating a probability of occurrence of a corresponding operation hopping event in the first set of operation hopping events, by:
     obtaining historical operation data generated using a number of other user identifiers different from the user identifier; and
     for each operation hopping event contained in the first set of operation hopping events, determining the probability value of the corresponding operation hopping event according to the historical operation data;
   iteratively updating, by the server for each transaction corresponding to the user identifier, the probability values of the first set of operation hopping events corresponding to the user identifier;
   receiving, by the server, a payment request corresponding to a current transaction, wherein the payment request contains the user identifier and operation data generated in the current transaction corresponding to the user identifier;

determining, by the server according to the operation data, at least one operation hopping sequence produced in the current transaction, wherein the at least one operation hopping sequence contains a plurality of different operation hopping events that happen in sequence in the operation hopping sequence;

obtaining, by the server from the probability values of the first set of operation hopping events corresponding to the user identifier, a probability value corresponding to each of the different operation hopping events of the at least one operation hopping sequence, by adjusting probability values used for risk identification in a previous transaction occurred prior to the current transaction, the probability values for the previous transaction being generated according to operation data generated in the previous transaction corresponding to the user identifier;

adjusting, by the server, the obtained probability values according to the at least one operation hopping sequence;

determining, by the server, a risk degree of the current transaction according to the obtained probability values and the at least one operation hopping sequence; and performing, by the server, risk identification on the current transaction according to the risk degree.

2. The method according to claim 1, wherein adjusting the obtained probability values according to the at least one operation hopping sequence comprises:

decreasing the obtained probability values when determining that the risk degree corresponding to the current transaction is higher than a threshold value, and increasing the obtained probability values when determining that the risk degree corresponding to the current transaction is equal to or less than the threshold value, wherein the adjusted probability values are used for risk identification of a next transaction subsequent to the current transaction corresponding to the user identifier.

3. The method according to claim 1, further comprising:

obtaining historical operation data generated through the user identifier; and for each operation hopping event contained in a second set of operation hopping events corresponding to the user identifier, determining an initial probability value of a respective operation hopping event in the second set of operation hopping events according to the historical operation data generated through the user identifier.

4. The method according to claim 3, wherein the at least one operation hopping sequence includes two or more operation hopping sequences, and determining the risk degree of the current transaction according to the obtained probability values and the at least one operation hopping sequence comprises:

determining operation hopping events contained in each operation hopping sequence of the two or more operation hopping sequences, and determining a risk value of each operation hopping sequence according to a probability value corresponding to each operation hopping event; and after obtaining the risk value of each operation hopping sequence, determining the risk degree of the current transaction according to the risk value of each operation hopping sequence.

5. An apparatus comprising:

a processor; and a memory coupled to the processor and configured to store instructions executable by the processor, wherein the processor is configured to execute the instructions to perform operations including:

determining a first set of operation hopping events corresponding to a user identifier;

determining a probability value indicating a probability of occurrence of a corresponding operation hopping event in the first set of operation hopping events, by:

obtaining historical operation data generated using a number of other user identifiers different from the user identifier; and for each operation hopping event contained in the first set of operation hopping events, determining the probability value of the corresponding operation hopping event according to the historical operation data;

iteratively updating, for each transaction corresponding to the user identifier, the probability values of the first set of operation hopping events corresponding to the user identifier;

receiving a payment request corresponding to a current transaction, wherein the payment request contains the user identifier and operation data generated in the current transaction corresponding to the user identifier;

determining, according to the operation data, at least one operation hopping sequence produced in the current transaction, wherein the at least one operation hopping sequence contains a plurality of different operation hopping events that happen in sequence in the operation hopping sequence;

obtaining, from the probability values of the first set of operation hopping events corresponding to the user identifier, a probability value corresponding to each of the different operation hopping events of the at least one operation hopping sequence, by adjusting probability values used for risk identification in a previous transaction occurred prior to the current transaction, the probability values for the previous transaction being generated according to operation data generated in the previous transaction corresponding to the user identifier;

adjusting the obtained probability values according to the at least one operation hopping sequence;

determining a risk degree of the current transaction according to the obtained probability values and the at least one operation hopping sequence; and performing risk identification on the current transaction according to the risk degree.

6. The apparatus according to claim 5, wherein adjusting the obtained probability values according to the at least one operation hopping sequence comprises:

decreasing the obtained probability values when determining that the risk degree corresponding to the current transaction is higher than a threshold value, and increasing the obtained probability values when determining that the risk degree corresponding to the current transaction is equal to or less than the threshold value, wherein the adjusted probability values are used for risk identification of a next transaction subsequent to the current transaction corresponding to the user identifier.

7. The apparatus according to claim 5, further comprising:

obtaining historical operation data generated through the user identifier; and for each operation hopping event contained in a second set of operation hopping events corresponding to the user identifier, determining an initial probability value of a respective operation hopping event in the second set of operation hopping events according to the historical operation data generated through the user identifier.

8. The method according to claim 1, wherein the operation data include operation data of two or more dimensions generated in the current transaction; and the method further comprises:
   with respect to a respective dimension, determining a risk degree of the current transaction according to the operation data of the respective dimension; and
   when different risk degrees of the current transaction corresponding to the two or more dimensions are obtained, performing risk identification on the current transaction according to the obtained different risk degrees.

9. The method according to claim 8, wherein determining the risk degree of the current transaction according to the operation data of the respective dimension comprises:
   in response to the operation data of the respective dimension including operation data of a device dimension, determining at least one operation hopping sequence of the device dimension generated in the current transaction according to the operation data of the device dimension, wherein the at least one operation hopping sequence of the device dimension contains at least one operation hopping event of the device dimension;
   determining a first risk parameter corresponding to the at least one operation hopping event of the device dimension contained in the at least one operation hopping sequence of the device dimension; and
   determining the risk degree of the current transaction according to the first risk parameter.

10. The method according to claim 9, wherein determining the risk degree of the current transaction according to the operation data of the respective dimension further comprises:
    in response to the operation data of the respective dimension including operation data of a user dimension, determining at least one operation hopping sequence of the user dimension generated in the current transaction according to the operation data of the user dimension, wherein the at least one operation hopping sequence of the user dimension contains at least one operation hopping event of the user dimension;
    determining a second risk parameter corresponding to the at least one operation hopping event of the user dimension contained in the at least one operation hopping sequence of the user dimension; and
    determining the risk degree of the current transaction according to the first risk parameter and the second risk parameter.

11. The method according to claim 10, wherein determining the risk degree of the current transaction according to the operation data of the respective dimension further comprises:
    in response to the operation data of the respective dimension including operation data of a merchant dimension, determining at least one operation hopping sequence of the merchant dimension generated in the current transaction according to the operation data of the merchant dimension, wherein the at least one operation hopping sequence of the merchant dimension contains at least one operation hopping event of the merchant dimension;
    determining a third risk parameter corresponding to the at least one operation hopping event of the merchant dimension contained in the at least one operation hopping sequence of the merchant dimension; and
    determining the risk degree of the current transaction according to the first risk parameter, the second risk parameter, and the third risk parameter.

12. The method according to claim 11, wherein determining the risk degree of the current transaction according to the operation data of the respective dimension further comprises:
    in response to the operation data of the respective dimension including operation data of a location dimension, determining at least one operation hopping sequence of the location dimension generated in the current transaction according to the operation data of the location dimension, wherein the at least one operation hopping sequence of the location dimension contains at least one operation hopping event of the location dimension;
    determining a fourth risk parameter corresponding to the at least one operation hopping event of the location dimension contained in the at least one operation hopping sequence of the location dimension; and
    determining the risk degree of the current transaction according to the first risk parameter, the second risk parameter, the third risk parameter, and the fourth risk parameter.

13. The apparatus according to claim 5,
    wherein the operation data include operation data of two or more dimensions generated in the current transaction;
    with respect to a respective dimension, determining a risk degree of the current transaction according to the operation data of the respective dimension; and
    when different risk degrees of the current transaction corresponding to the two or more dimensions are obtained, performing risk identification on the current transaction according to the obtained different risk degrees.

14. The apparatus according to claim 13, wherein determining the risk degree of the current transaction according to the operation data of the respective dimension comprises:
    in response to the operation data of the respective dimension including operation data of a device dimension, determining at least one operation hopping sequence of the device dimension generated in the current transaction according to the operation data of the device dimension, wherein the at least one operation hopping sequence of the device dimension contains at least one operation hopping event of the device dimension;
    determining a first risk parameter corresponding to the at least one operation hopping event of the device dimension contained in the at least one operation hopping sequence of the device dimension; and
    determining the risk degree of the current transaction according to the first risk parameter.

15. The apparatus according to claim 14, wherein determining the risk degree of the current transaction according to the operation data of the respective dimension further comprises:
    in response to the operation data of the respective dimension including operation data of a user dimension, determining at least one operation hopping sequence of the user dimension generated in the current transaction according to the operation data of the user dimension, wherein the at least one operation hopping sequence of the user dimension contains at least one operation hopping event of the user dimension;

determining a second risk parameter corresponding to the at least one operation hopping event of the user dimension contained in the at least one operation hopping sequence of the user dimension; and determining the risk degree of the current transaction according to the first risk parameter and the second risk parameter.

16. The apparatus according to claim 15, wherein determining the risk degree of the current transaction according to the operation data of the respective dimension further comprises:

in response to the operation data of the respective dimension including operation data of a merchant dimension, determining at least one operation hopping sequence of the merchant dimension generated in the current transaction according to the operation data of the merchant dimension, wherein the at least one operation hopping sequence of the merchant dimension contains at least one operation hopping event of the merchant dimension;

determining a third risk parameter corresponding to the at least one operation hopping event of the merchant dimension contained in the at least one operation hopping sequence of the merchant dimension; and determining the risk degree of the current transaction according to the first risk parameter, the second risk parameter, and the third risk parameter.

17. The apparatus according to claim 16, wherein determining the risk degree of the current transaction according to the operation data of the respective dimension further comprises:

in response to the operation data of the respective dimension including operation data of a location dimension, determining at least one operation hopping sequence of the location dimension generated in the current transaction according to the operation data of the location dimension, wherein the at least one operation hopping sequence of the location dimension contains at least one operation hopping event of the location dimension;

determining a fourth risk parameter corresponding to the at least one operation hopping event of the location dimension contained in the at least one operation hopping sequence of the location dimension; and determining the risk degree of the current transaction according to the first risk parameter, the second risk parameter, the third risk parameter, and the fourth risk parameter.

18. A non-transitory computer-readable storage medium storing instructions executable by a processor to cause the processor to perform operations comprising:

determining a first set of operation hopping events corresponding to a user identifier;

determining a probability value indicating a probability of occurrence of a corresponding operation hopping event in the first set of operation hopping events, by:

obtaining historical operation data generated using a number of other user identifiers different from the user identifier; and for each operation hopping event contained in the first set of operation hopping events, determining the probability value of the corresponding operation hopping event according to the historical operation data;

iteratively updating, for each transaction corresponding to the user identifier, the probability values of the first set of operation hopping events corresponding to the user identifier;

receiving a payment request corresponding to a current transaction, wherein the payment request contains the user identifier and operation data generated in the current transaction corresponding to the user identifier;

determining, according to the operation data, at least one operation hopping sequence produced in the current transaction, wherein the at least one operation hopping sequence contains a plurality of different operation hopping events that happen in sequence in the operation hopping sequence;

obtaining, from the probability values of the first set of operation hopping events corresponding to the user identifier, a probability value corresponding to each of the different operation hopping events of the at least one operation hopping sequence, by adjusting probability values used for risk identification in a previous transaction occurred prior to the current transaction, the probability values for the previous transaction being generated according to operation data generated in the previous transaction corresponding to the user identifier;

adjusting the obtained probability values according to the at least one operation hopping sequence;

determining a risk degree of the current transaction according to the obtained probability values and the at least one operation hopping sequence; and performing risk identification on the current transaction according to the risk degree.

19. The non-transitory computer-readable storage medium according to claim 18, wherein adjusting the obtained probability values according to the at least one operation hopping sequence comprises:

decreasing the obtained probability values when determining that the risk degree corresponding to the current transaction is higher than a threshold value, and increasing the obtained probability values when determining that the risk degree corresponding to the current transaction is equal to or less than the threshold value, wherein the adjusted probability values are used for risk identification of a next transaction subsequent to the current transaction corresponding to the user identifier.

20. The non-transitory computer-readable storage medium according to claim 18, wherein the operation data include operation data of two or more dimensions generated in the current transaction; and the method further comprises:

with respect to a respective dimension, determining a risk degree of the current transaction according to the operation data of the respective dimension; and when different risk degrees of the current transaction corresponding to the two or more dimensions are obtained, performing risk identification on the current transaction according to the obtained different risk degrees.

* * * * *